(12) United States Patent
Katayama et al.

(10) Patent No.: US 12,649,846 B2
(45) Date of Patent: Jun. 9, 2026

(54) SELF-EXTINGUISHING RESIN MOLDED BODY

(71) Applicants: Novacel Co., Ltd., Tokyo (JP); Polyplastics Co., Ltd., Tokyo (JP)

(72) Inventors: Hiroshi Katayama, Tokyo (JP); Fumitake Utsumi, Tokyo (JP); Takuhiro Koketsu, Tokyo (JP); Kota Fujiwara, Tokyo (JP)

(73) Assignees: NOVACEL CO., LTD., Tokyo (JP); POLYPLASTICS CO., LTD., Tokyo (JP)

( * ) Notice: Subject to any disclaimer, the term of this patent is extended or adjusted under 35 U.S.C. 154(b) by 1035 days.

(21) Appl. No.: 17/282,196

(22) PCT Filed: Oct. 2, 2019

(86) PCT No.: PCT/JP2019/038897
§ 371 (c)(1),
(2) Date: Apr. 1, 2021

(87) PCT Pub. No.: WO2020/071420
PCT Pub. Date: Apr. 9, 2020

(65) Prior Publication Data
US 2021/0340356 A1 Nov. 4, 2021

(30) Foreign Application Priority Data

Oct. 5, 2018 (JP) ................................. 2018-190123

(51) Int. Cl.
| | |
|---|---|
| *C08K 5/523* | (2006.01) |
| *C08K 3/04* | (2006.01) |
| *C08K 3/22* | (2006.01) |
| *C08K 3/26* | (2006.01) |
| *C08K 5/00* | (2006.01) |
| *C08K 7/14* | (2006.01) |
| *C08L 23/12* | (2006.01) |

(52) U.S. Cl.
CPC ................ *C08K 5/523* (2013.01); *C08K 3/04* (2013.01); *C08K 3/22* (2013.01); *C08K 3/26* (2013.01); *C08K 5/0066* (2013.01); *C08K 7/14* (2013.01); *C08L 23/12* (2013.01); *C08K 2003/222* (2013.01); *C08K 2003/2237* (2013.01); *C08K 2003/2296* (2013.01)

(58) Field of Classification Search
CPC ........ C08L 23/02; C08L 23/025; C08L 23/18; C08L 23/04; C08L 23/06; C08L 23/08; C08L 23/815; C08L 23/10; C08L 23/12; C08L 23/14; C08L 23/142; C08L 23/145; C08L 23/47; C08K 3/40; C08K 7/14; C08K 5/066; C08K 3/32
See application file for complete search history.

(56) References Cited

U.S. PATENT DOCUMENTS

| | | | |
|---|---|---|---|
| 3,462,389 A * | 8/1969 | Schleede | C08K 3/30 524/584 |
| 5,885,732 A | 3/1999 | Verhoog | |
| 2008/0166511 A1 | 7/2008 | Honma et al. | |
| 2010/0125118 A1* | 5/2010 | Brant | C08L 23/12 524/427 |
| 2014/0288217 A1 | 9/2014 | Hatanaka et al. | |
| 2015/0094409 A1† | 4/2015 | Kenny | |
| 2015/0368459 A1 | 12/2015 | Yamanaka et al. | |
| 2017/0349732 A1 | 12/2017 | Steenbakkers-Menting et al. | |
| 2018/0127567 A1 | 5/2018 | van der Mee et al. | |
| 2018/0265683 A1 | 9/2018 | Shimizu et al. | |
| 2021/0355287 A1* | 11/2021 | Wen | C08L 23/142 |

FOREIGN PATENT DOCUMENTS

| | | | |
|---|---|---|---|
| EP | 2789653 A1 | 10/2014 | |
| JP | 776640 A | 3/1995 | |
| JP | 8143715 A | 6/1996 | |
| JP | 20001597 A | 1/2000 | |
| JP | 5048936 B2 | 3/2007 | |
| JP | 2009167270 A | 7/2009 | |
| JP | 201188970 A | 5/2011 | |
| JP | 2012158648 A | 8/2012 | |
| JP | 5959183 B2 | 6/2013 | |
| JP | 2013119575 A | 6/2013 | |
| JP | 2014208821 A | 11/2014 | |
| JP | 2016120662 A | 7/2016 | |
| JP | 2017186576 A | 10/2017 | |
| JP | 2018503720 A | 2/2018 | |
| KR | 1020110114706 A | 10/2011 | |

OTHER PUBLICATIONS

European Search Report issued in corresponding European Application No. 19868465.6, transmitted at least as early as Jun. 8, 2022 (8 pages).
Notification of Transmittal of Translation of the International Preliminary Report on Patentability Issued in PCT/JP2019/038897, Date of Mailing Apr. 15, 2021 (9 pages).
Korean Office Action issued in corresponding Korean Application No. 10-2021-7011853 date of mailing Apr. 30, 2024 (7 pages).

* cited by examiner
† cited by third party

*Primary Examiner* — Jeffrey S Lenihan
(74) *Attorney, Agent, or Firm* — FLYNN THIEL, P.C.

(57) ABSTRACT

Self-extinguishing resin molded body obtained from a resin composition containing a polyolefin resin, a phosphorus-based flame retardant, and a glass fiber. The self-extinguishing resin molded body contains from 15 to 30 mass % of the phosphorus-based flame retardant and from 5 to 50 mass % of the glass fiber, and satisfies the following: a thickness of the resin molded body is from 1.5 to 8.0 mm; the self-extinguishing resin molded body self-extinguishes within 2 minutes after the completion of a burning test; the self-extinguishing resin molded body does not have a hole after burning.

5 Claims, No Drawings

SELF-EXTINGUISHING RESIN MOLDED BODY

TECHNICAL FIELD

According to one embodiment of the present invention, the present invention relates to a self-extinguishing resin molded body that can be used in a battery module enclosure part or a peripheral part of a battery-powered electric transportation device, such as an electric vehicle or an electric two-wheeler.

BACKGROUND ART

A rechargeable energy storage system (REESS) such as batteries can be found in battery-powered electric transportation devices such as electric vehicles (EVs) and plug-in hybrid vehicles (PHVs). All parts constituting such system are required to have higher flame retardancy and better self-extinguishing property than typical in-vehicle resin parts. For example, the parts must comply with electrical safety regulations, such as ECE-R100 in Europe.

JP 2018-503720 T describes an article obtained by molding pellets of a flame retardant long glass fiber reinforced polypropylene composition, as well as articles that comply with the UL 94 standard 20 mm Vertical Burning Test (V-0) and 125 mm Vertical Burning Test (5V) at a thickness of 1.6 mm/2.0 mm/2.5 mm/3.2 mm.

JP 2017-186576 A describes a polybutylene terephthalate resin composition having a high degree of flame retardancy that can be applied to a charger connector for electric vehicles, a battery capacitor holder, a battery capacitor enclosure, or an enclosure for charging stand for electric vehicles; a bromine-based flame retardant is used.

JP 5048936 B describes the invention of a flame-retardant resin composition comprising: (A) from 47 to 89.9 mass % of a resin mixture containing from 70 to 99.5 mass % of a polyolefin resin and from 0.5 to 30 mass % of a resin having a polar group; (B) from 5 to 25 mass % of piperazine pyrophosphate and/or piperazine polyphosphate; (C) from 5 to 25 mass % of at least one melamine compound selected from the group consisting of dimelamine pyrophosphate, melamine pyrophosphate, and melamine polyphosphate; and (D) from 0.1 to 3 mass % of zinc oxide (claims). Furthermore, although the document describes that glass fiber can be added as one of a number of optional components (see paragraph 0025), there is no description regarding the amount of glass fiber to be added and the specific effects due to the addition.

SUMMARY OF INVENTION

In one aspect of the present invention, an object is to provide a self-extinguishing molded body having a high degree of flame retardancy and good mechanical strength.

In one embodiment, the present invention provides a self-extinguishing resin molded body obtained from a resin composition containing a polyolefin resin (A), a phosphorus-based flame retardant (B), and a glass fiber (C), wherein the self-extinguishing resin molded body contains from 15 to 30 mass % of the phosphorus-based flame retardant (B) and from 5 to 50 mass % of the glass fiber (C); and the self-extinguishing resin molded body satisfies the following (I) to (III).

(I) A thickness of the self-extinguishing resin molded body is from 1.5 to 8.0 mm.

(II) The self-extinguishing resin molded body self-extinguishes within 2 minutes after the completion of a burning test using burning test method E as described below.

(III) The self-extinguishing resin molded body does not have a hole after being subjected to a burning test using burning test method E as described below.

Burning test method E: A plaque (150×150×2.0 mm) made of the molded body described above is used. A 200 mm-long flame is applied from above the plaque directly onto the center of the plaque for 130 seconds. The distance from the flame contact position on the plaque to the burner mouth is 150 mm.

In another embodiment, the present invention provides a self-extinguishing resin molded body obtained from a resin composition containing a polyolefin resin (A), a phosphorus-based flame retardant (B), a glass fiber (C), and a carbonization accelerator (D) selected from the group consisting of magnesium bicarbonate, zinc oxide, titanium oxide, magnesium oxide, and silicon oxide, wherein the molded body contains from 15 to 30 mass % of the phosphorus-based flame retardant (B), from 5 to 50 mass % of the glass fiber (C), and from 0.7 to 5 mass % of the carbonization accelerator (D), the content ratio of component (D) in the total amount of component (C) and component (D) being from 2 to 13 mass %; and the self-extinguishing resin molded body satisfies the following (I) to (III).

(I) A thickness of the self-extinguishing resin molded body is from 1.5 to 8.0 mm.

(II) The self-extinguishing resin molded body self-extinguishes within 2 minutes after the completion of a burning test using burning test method E as described below.

(III) The self-extinguishing resin molded body does not have a hole after being subjected to a burning test using burning test method E as described below.

Burning test method E: A plaque (150×150×2.0 mm) made of the molded body described above is used. A 200 mm-long flame is applied from above the plaque directly onto the center of the plaque for 130 seconds. The distance from the flame contact position on the plaque to the burner mouth is 150 mm.

In addition to self-extinguishing property that contains a fire when it happens, the resin molded body according to an example of the present invention has flame retardancy that complies with standards (such as ECE-R100) required for parts to be installed in a battery-powered electric transportation device as well as good mechanical strength.

DESCRIPTION OF EMBODIMENTS

Several examples of the resin composition used in the self-extinguishing resin molded body according to an embodiment of the present invention will be described below. The resin composition may be a resin composition containing components (A) to (C) (not containing component (D)), or may be a resin composition containing components (A) to (D).

Resin Composition
Polyolefin Resin (A)

Examples of the polyolefin resin of component (A) included in the resin composition include: a α-C2 to 20 chain olefin resin or a cyclic olefin resin; examples of the α-C2 to 20 chain olefin resin include a polyethylene resin (High Density Polyethylene [HDPE], Low Density Polyethylene [LDPE], Linear Low Density Polyethylene [LLDPE], Very Low Density Polyethylene and Ultra Low Density Polyethylene [VLDPE, ULDPE], etc.), a polypropylene resin, and a methylpentene resin. These polyolefin resins can be used alone or in a combination of two or more. In one embodiment of the present invention, a polypropylene resin is preferably used.

According to some specific examples, the polypropylene resin may be a homopolymer of propylene, or may be a copolymer of propylene and another copolymerizable monomer. Other copolymerizable monomers include, for example: olefin monomers, such as a α-C2 to 20 chain olefin exemplified by ethylene, 1-butene, isobutene, 1-pentene, 4-methyl-1-pentene, and cyclic olefins; vinyl ester-based monomers, such as vinyl acetate and vinyl propionate; (meth)acrylic monomers, for example, (meth)acrylic acid, alkyl (meth)acrylate, vinyl cyanide monomers such as (meth)acrylonitrile; diene monomers such as butadiene; unsaturated polyvalent carboxylic acids or acid anhydrides thereof, such as maleic acid, itaconic acid, citraconic acid or acid anhydrides thereof; imide-based monomers, for example, maleimide and N-substituted maleimides exemplified by N-alkylmaleimides such as N—Cl to 4 alkylmaleimides. These copolymerizable monomers may be used alone or in a combination of two or more.

In some more detailed examples, the polypropylene resin can be: homopolypropylene, which is a homopolymer; or a copolymer, for example, a propylene-α2 to 20 chain olefin copolymer (random copolymer, block copolymer, or the like) having a propylene content of 80 mass % or greater such as a propylene-ethylene copolymer, a propylene-butene-1 copolymer, and a propylene-ethylene-butene-1 copolymer. In a preferred aspect of the present invention, the polypropylene resin is a homopolypropylene or a propylene-α2 to 6 chain olefin copolymer (random copolymer, block copolymer, or the like); in another preferred aspect of the present invention, the polypropylene resin is a homopolypropylene or a propylene-ethylene copolymer (random copolymer or block copolymer). These polypropylene resins may be used alone or in a combination of two or more.

Phosphorus-Based Flame Retardant (B)

According to an example of the present invention, the phosphorus-based flame retardant of component (B) included in the resin composition may be an organic phosphoric acid compound (B1) or an organic phosphate compound (B2), or a mixture of the two, and do not contain halogen atoms.

Examples of the organic phosphoric acid compound (B1) include phosphoric acid, melamine orthophosphate, melamine pyrophosphate, melamine polyphosphate, and melamine phosphate; of these, the organic phosphoric acid compound (B1) is melamine polyphosphate in a preferred aspect of the present invention, and is melamine pyrophosphate in another preferred aspect of the present invention.

Examples of the organic phosphate compound (B2) include piperazine orthophosphate, piperazine pyrophosphate, and piperazine polyphosphate; of these, the organic phosphate compound (B2) is piperazine polyphosphate in a preferred aspect of the present invention, and is piperazine pyrophosphate in another preferred aspect of the present invention.

When component (B) is a mixture of component (B1) and component (B2), the mass ratio of component (B1) to component (B2) is from 1:99 to 99:1 in a preferred aspect of the present invention, from 10:90 to 90:10 in another preferred aspect of the present invention, and from 30:70 to 70:30 in yet another preferred aspect of the present invention. When the mass ratio is within the range from 1:99 to 99:1, the flame retardant effect is good.

Examples of component (B) include commercially available products such as ADK STAB FP-2100JC, FP-22005, and FP-25005, all available from ADEKA Corporation.

In one embodiment of the present invention, component (B) may have an average particle size of 40 μm or less; meanwhile, in another embodiment of the present invention, from the perspective of flame retardancy, component (B) may have an average particle size of 10 μm or less. When the average particle size of component (B) is 40 μm or less, dispersibility of component (B) in the polyolefin resin of component (A) is good, high flame retardancy can be obtained, and the mechanical strength of the resin molded body is also good.

The phosphorus-based flame retardant of component (B) may contain known flame retardant aids, foaming agents, or other non-halogen flame retardants as necessary, to the extent that the object of the present invention is not impaired. In some cases, the phosphorus-based flame retardant of component (B) may contain a carbonization accelerator corresponding to component (D) as described below.

In a preferred aspect of the present invention, the flame retardant aid may be selected from the group consisting of a condensate of a dimer or higher multimer of pentaerythritol and an ester thereof; in another preferred aspect of the present invention, the flame retardant aid may be one or two or more selected from the group consisting of pentaerythritol and an ester thereof, dipentaerythritol and an ester thereof, and tripentaerythritol and an ester thereof. The flame retardant aid contains, for example, the aforementioned condensate of pentaerythritol as a main component (preferably 80 mass % or greater), with another flame retardant aid taking up the remaining mass percentage.

Examples of the other flame retardant aid include: polyols, such as pentaerythritol, cellulose, maltose, glucose, arabinose, ethylene glycol, propylene glycol, polyethylene glycol, ethylene-vinyl alcohol copolymers; or, an ester compound produced by reacting these polyol components with a carboxylic acid; triazine derivatives, such as melamine, other melamine derivatives, guanamine or other guanamine derivatives, melamine(2,4,6-triamino-1,3,5-triazine), isocyanuric acid, tris(2-hydroxyethyl)isocyanuric acid, tris(hydroxymethyl)isocyanuric acid, tris(3-hydroxypropyl)isocyanurate, and tris(4-hydroxyphenyl)isocyanurate.

In some embodiments of the present invention, examples of the foaming agent may be selected from: melamine, and melamine derivatives such as melamine formaldehyde resin, methylol melamine having from 4 to 9 carbons, and melamine cyanurate; urea, and urea derivatives such as thiourea, (thio)urea-formaldehyde resin, methylol(thio)urea having from 2 to 5 carbons; guanamins such as benzoguanamine, phenylguanamine, acetoguanamine, and succinylguanamine; reaction products of guanamines and formaldehyde; and nitrogen-containing compounds such as dicyandiamide, guanidin, and guanidine sulfamate.

In some embodiments of the present invention, other non-halogen flame retardants include phosphate-based flame retardants, ammonium polyphosphate, red phosphorus, magnesium hydroxide, aluminum hydroxide, and expanded graphite. Examples of the phosphate-based flame retardant include triphenyl phosphate, tricresyl phosphate, trixylenyl phosphate, tris(isopropylphenyl)phosphate, tris(o- or p-phenylphenyl)phosphate, trinaphthyl phosphate, cresyl diphenyl phosphate, xylenyldiphenyl phosphate, diphenyl(2-ethylhexyl)phosphate, di(isopropylphenyl)phenyl phosphate, o-phenylphenyldicresyl phosphate, tris(2,6-dimethylphenyl) phosphate, tetraphenyl-m-phenylene diphosphate, tetraphenyl-p-phenylene diphosphate, phenylresorcin polyphosphate, bisphenol A-bis(diphenyl phosphate), bisphenol A polyphenyl phosphate, and dipyrocatechol hypodiphosphate. In addition, fatty acid or aromatic phosphates, for example, orthophosphates such as diphenyl(2-ethylhexyl) phosphate, diphenyl-2-acryloyloxyethyl phosphate, diphenyl-2-methacryloyloxyethyl phosphate, phenyl neopentyl phosphate, pentaerythritol diphenyl diphosphate, and ethyl pyrocatechol phosphate, as well as mixtures thereof, can also be included in the examples.

In one embodiment, the flame retardant aid may be used alone in the phosphorus-based flame retardant of component (B) or used in a combination. With the addition of a flame retardant aid, the amount of flame retardant added can be reduced, or flame retardancy that would not be possible by using only flame retardant can be achieved. Therefore, the flame retardant aid can be appropriately used according to the type and application of the resin to which the flame retardant will be added. The particle size, melting point, viscosity, and the like of the flame retardant aid can be selected so as to achieve excellent flame retardancy effects and powder characteristics.

The amount of the flame retardant aid to be added is, for example, from 10 to 60 parts by mass in a preferred aspect of the present invention, from 15 to 50 parts by mass in another preferred aspect of the present invention, and from 15 to 45 parts by mass in yet another preferred aspect of the present invention, per 100 parts by mass of the total content of the aforementioned (B1) and (B2). When the amount of the flame retardant aid added is within the range described above, the mechanical strength of the molded body is excellent, surface stickiness is not generated, and a strong carbonized layer that acts to boost flame retardancy is formed, improving flame retardancy.

In some embodiments of the present invention, the resin composition may contain a resin mixture containing the phosphorus-based flame retardant of component (B). The content ratio of the total content of the aforementioned (B1) and (B2) of the phosphorus-based flame retardant of component (B) in the resin mixture is from 50 to 80 mass % in a preferred aspect of the present invention, from 55 to 75 mass % in another preferred aspect of the present invention, and from 60 to 70 mass % in yet another preferred aspect of the present invention.

The remainder of the content ratio mentioned above of the resin mixture may be the polyolefin resin of component (A). Furthermore, to the extent that the object of the present invention is not impaired, the resin mixture may contain known antioxidants and lubricants as necessary. Specifically, the polyolefin resin of component (A) is a polypropylene resin in a preferred aspect of the present invention, and is a homopolypropylene or propylene-ethylene copolymer (random copolymer or block copolymer) in another preferred aspect of the present invention.

Examples of the antioxidant include antioxidants for resins, such as those selected from known phosphorus-based antioxidants, sulfur-based antioxidants, phenol-based antioxidants (for example, phosphite-based antioxidants and thioether-based antioxidants such as those described in paragraphs 0015 to 0025 of JP 07-076640 A, and allyl phosphite and alkyl phosphite such as tris(2,4-di-t-butylphenyl) phosphite and trisisodecyl phosphite), and amine-based antioxidants. Examples of commercially available products include "Irganox 1010", available from BASF Japan, and "ADK STAB PEP36", available from ADEKA Corporation.

Examples of the lubricant include known lubricants such as lipids, waxes (excluding highly-branched polyethylene wax and microcrystalline wax), and silicone resins; for example, those selected from what is described in paragraphs 0068 to 0073 of JP 2009-167270 A. Examples of commercially available products include "ALFLOW H-50S", available from NOF Corporation.

Glass Fiber (C)

In some embodiments of the present invention, component (C) contained in the resin composition may be in the form of a glass fiber itself, or may be in the form of a resin mixture containing a glass fiber. When component (C) is in the form of a resin mixture, the content ratio of glass fiber per 100 mass % of the resin mixture is from 10 to 70 mass % in a preferred aspect of the present invention, from 20 to 65 mass % in another preferred aspect of the present invention, and from 30 to 60 mass % in yet another preferred aspect of the present invention.

When component (C) is in the form of a resin mixture containing a glass fiber, the remainder of the content ratio may be a resin component containing the polyolefin resin of component (A). The polyolefin resin of component (A) is a polypropylene resin in a preferred aspect of the present invention, and is a homopolypropylene or propylene-ethylene copolymer (random copolymer or block copolymer) in another preferred aspect of the present invention. When component (C) is in the form of a resin mixture containing a glass fiber, the glass fiber in the resin mixture is component (C), and the resin component is included in component (A).

The filament diameter of the glass fiber of component (C) is from 9 to 20 μm in a preferred aspect of the present invention, from 10 to 17 μm in another preferred aspect of the present invention, and from 13 to 17 μm in yet another preferred aspect of the present invention, and may be a long fiber or a short fiber.

When the glass fiber of component (C) is a long fiber, it may be used in the form of a resin-applied long glass fiber fiber bundle; such resin-applied long glass fiber bundle can be obtained by applying a resin component containing the polyolefin resin of component (A) in a molten state on a bundle of long glass fiber of which the fiber filaments are aligned in the lengthwise direction and bundled together, and cutting the bundle into chunks of a predetermined length after integration.

According to an embodiment of the present invention, when component (C) is a resin-applied long glass fiber fiber bundle, the resin component containing the polyolefin resin of component (A), while it may contain a resin additive such as a stabilizer, does not contain a flame retardant such as component (B) or a dispersant as defined in paragraphs 0051 to 0056 of Patent Document 1. Examples of the dispersant include highly-branched poly(alpha-olefin) and microcrystalline wax.

According to an embodiment of the present invention, when the glass fiber of component (C) is in the form of a resin-applied long glass fiber fiber bundle, the glass fiber in the resin-applied long glass fiber fiber bundle is component (C), and the resin component is included in component (A).

According to an embodiment of the present invention, depending on the result of application, the resin-applied long glass fiber bundle described here includes: the ones in which resin permeates to the center of the long glass fiber bundle (the long glass fiber bundle is impregnated with the resin), or resin penetrates between the fiber filaments in the center of the fiber bundle (hereinafter a resin-applied long glass fiber bundle in such state will be referred to as "resin-impregnated long glass fiber bundle"); the ones in which only the surface of the reinforcing long fiber bundle is covered with resin (or "resin-coated long glass fiber bundle"); and the ones somewhere in between the above two states, that is, the surface of the fiber bundle is covered with resin, and the resin permeates only the vicinity of the surface but not all the way to the center ("partial-resin-impregnated long glass fiber bundle"); of these, "resin-impregnated long glass fiber bundle" is preferable.

According to an embodiment of the present invention, the resin-applied long glass fiber bundle can be produced by well-known production methods, such as those listed in paragraph 0043 of JP 5959183 B. The number of glass fiber filaments in the long glass fiber bundle can be adjusted, for example, in the range from 100 to 30000.

According to an embodiment of the present invention, the length of the resin-applied long glass fiber bundle (that is, the length of the glass fiber of component (C)) is from 5 to 50 mm in a preferred aspect of the present invention, from 7 to 25 mm in another preferred aspect of the invention, and from 9 to 15 mm in yet another preferred aspect of the invention. The diameter of the resin-applied fiber bundle is not limited, but can be, for example, in the range from 0.5 to 5 mm.

According to an embodiment of the present invention, when the glass fiber of component (C) is a short fiber, the glass fiber of component (C) is a short glass fiber having a length from 1 to 4 mm in a preferred aspect of the present invention, and may be a short glass fiber having a length from 2 to 3 mm in another preferred aspect of the present invention. The glass short fiber may be, for example, chopped strands, or a surface-treated fiber.

According to an embodiment of the present invention, when the glass fiber of component (C) is a short fiber, a resin mixture in which the short glass fiber is dispersed in a resin component containing the polyolefin resin of component (A) may be used, and the resin component may contain a resin additive such as a stabilizer or the phosphorus-based flame retardant of component (B).

According to an embodiment of the present invention, when the glass fiber of component (C) is in the form of a resin mixture containing component (A) and component (B), the glass fiber in the resin mixture is component (C), the resin component is included in component (A), and the phosphorus-based flame retardant is included in component (B). The glass fiber of component (C) may contain both the aforementioned long fiber (resin-applied long glass fiber fiber bundle) and short glass fiber.

Carbonization Accelerator (D)

According to an embodiment of the present invention, the resin composition may further contain a carbonization accelerator selected from the group consisting of magnesium bicarbonate, zinc oxide, titanium oxide, magnesium oxide, and silicon oxide as component (D). The carbonization accelerator of component (D) is a component that can increase flame retardancy when used together with the phosphorus-based flame retardant of component (B), and also a component that, when used in combination with component (C) in an amount of a predetermined range, can contribute to achieving advantages such as self-extinguishing property, flame retardancy that complies with standards (such as ECE-R100) required for parts to be installed in a battery-powered electric transportation device, as well as mechanical strength. When only the carbonization accelerator of component (D) is included, not also the glass fiber of component (C), such advantages cannot be achieved as desired.

Examples of the carbonization accelerator include: organometallic complex compounds such as ferrocene; metal hydroxides such as cobalt hydroxide, magnesium hydroxide, and aluminum hydroxide; alkaline earth metal borates such as magnesium borate and calcium magnesium borate; metal oxides such as manganese borate, zinc borate, zinc metaborate, antimony trioxide, alumina trihydrate, magnesium bicarbonate, aluminum oxide, magnesium oxide, silicon oxide, zirconium oxide, vanadium oxide, molybdenum oxide, nickel oxide, manganese oxide, titanium oxide, silicon oxide, cobalt oxide, and zinc oxide; aluminosilicates such as zeolite; silicate type solid acids such as silica titania; metal phosphates such as calcium phosphate, magnesium phosphate, aluminum phosphate, and zinc phosphate; and clay minerals such as hydrotalcite, kaolinite, sericite, pyrophyllite, bentonite and talc.

According to some embodiments, the carbonization accelerator of component (D) may be at least one selected from the group consisting of magnesium bicarbonate, zinc oxide, titanium oxide, magnesium oxide, and silicon oxide. Optionally, any of the other carbonization accelerators described above may also be included.

According to an embodiment of the present invention, the resin composition may contain a carbon black. Examples of the carbon black include known furnace black, channel black, acetylene black, and ketjen black. The carbon black included in the resin composition may be a resin mixture containing carbon black (master batch). The content of carbon black is from 0.01 to 40 mass % in a preferred aspect of the present invention, and from 0.01 to 30 mass % in another preferred aspect of the present invention, per 100 mass % of the resin mixture. When the carbon black is a resin mixture containing carbon black, the remainder of the content ratio may be a resin component containing the polyolefin resin of component (A). The polyolefin resin of component (A) may be preferably, for example, a polypropylene resin, a polyethylene resin, or a mixture of polypropylene resin and polyethylene resin.

Additional Component

In some embodiments of the present invention, the resin composition may contain a heat stabilizer, a lubricant, a light stabilizer, an antioxidant, a colorant, a release agent, and the like to the extent that the problems that the present invention aims to address can be solved.

According to some embodiments of the present invention, the resin composition may be prepared, for example, by using a mixer such as a tumbler mixer, a Henschel mixer, a ribbon mixer, or a kneader for components other than component (C). After pre-mixing components other than component (C) using the mixer mentioned above, the resin composition can be prepared by adding component (C) to the mixture and applying a method such as: kneading the mixture with an extruder such as a single-screw or a twin-screw extruder to prepare pallets, or melting and kneading the mixture with a kneader such as a heated roller or a Banbury mixer.

Self-Extinguishing Resin Molded Body

According to some embodiments of the present invention, the self-extinguishing resin molded body includes the self-extinguishing resin molded body of a first embodiment and the self-extinguishing resin molded body of a second embodiment. The self-extinguishing resin molded body of a first embodiment is obtained from a resin composition containing the aforementioned components (A) to (C), not including component (D), wherein the self-extinguishing resin molded body contains from 15 to 30 mass % of the phosphorus-based flame retardant (B) and from 5 to 50 mass % of the glass fiber (C); and the self-extinguishing resin molded body satisfies the following (I) to (III). The self-extinguishing resin molded body of a second embodiment is obtained from a resin composition containing the aforementioned components (A) to (D), wherein the self-extinguishing resin molded body contains from 15 to 30 mass % of the phosphorus-based flame retardant (B), from 5 to 50 mass % of the glass fiber (C), and 0.7 to 5 mass % of the carbonization accelerator (D), the content ratio of component (D) in the total amount of component (C) and component (D) being from 2 to 13 mass %; and the self-extinguishing resin molded body satisfies the following (I) to (III).

The self-extinguishing resin molded bodies of both a first embodiment and a second embodiment have the following requirements (I) to (III).

(I) A thickness of the self-extinguishing resin molded body is from 1.5 to 8.0 mm.

(II) The self-extinguishing resin molded body self-extinguishes within 2 minutes after the completion of a burning test using burning test method E as described below.

(III) The self-extinguishing resin molded body does not have a hole after being subjected to a burning test using burning test method E as described below.

Burning test method E: A plaque (150×150×2.0 mm) made of the resin molded body described above is used. A 200 mm-long flame is applied from above the plaque directly onto the center of the plaque for 130 seconds. The distance from the flame contact position on the plaque to the burner mouth is 150 mm.

The size and shape of the resin molded body can be appropriately adjusted according to the application within a range that satisfies requirement (I). Requirement (I) is a thickness from 1.5 to 8.0 mm in one aspect of the present invention, from 2.0 to 6.0 mm in a preferred aspect of the present invention, and from 2.0 to 4.0 mm in another preferred aspect of the present invention.

"Self-extinguishing property" in requirement (II) refers to the property of an object in which the object burns in a flame when brought in contact with the flame but extinguishes itself within a certain period of time when moved away from the flame. According to some embodiments of the present invention, the resin molded body may have self-extinguishing property in which the resin molded body self-extinguishes within two minutes after the completion of a burning test using, in addition to the aforementioned method E, any one or more of the burning test methods A to D described below.

Among the burning test methods A to E of the present invention: method A has the most moderate burning conditions; method B and method C, in the order of increasing intensity of burning conditions, have relatively intense burning conditions; method D and method E have intense burning conditions.

The "hole" in requirement (III) refers to a through hole that penetrates from the burned surface of the molded body all the way through along the thickness direction of the molded body, not including holes with a maximum diameter of 3 mm or less, blind holes, or dents. In one embodiment, it is preferable that there is no hole formation found in the molded body after a burning test using, in addition to the aforementioned method E, any one or more of the burning test methods A to D described above.

Burning test method A: A plaque (150×150×2.0 mm) made of the molded body described above is used. A 20 mm-long flame according to UL 94 is applied from below the plaque directly onto the center of the plaque for 130 seconds. The distance from the flame contact position on the plaque to the burner mouth is 10 mm.

Burning test method B: A plaque (150×150×2.0 mm) made of the molded body described above is used. A 38 mm-long flame according to UL 94 is applied from below the plaque directly onto the center of the plaque for 130 seconds. The distance from the flame contact position on the plaque to the burner mouth is 20 mm.

Burning test method C: A plaque (150×150×2.0 mm) made of the molded body described above is used. A 125 mm-long flame according to UL 94 is applied from below the plaque directly onto the center of the plaque for 130 seconds. The distance from the flame contact position on the plaque to the burner mouth is 100 mm.

Burning test method D: A plaque (150×150×2.0 mm) made of the molded body described above is used. A 125 mm-long flame according to UL 94 is applied from below the plaque directly onto the center of the plaque for 130 seconds. The distance from the flame contact position on the plaque to the burner mouth is 40 mm.

The various burning test methods are based on the self-flammability tests described in the European ECE-R100, and the resin molded body according to an embodiment of the present invention having self-extinguishing property in the various burning test methods described above can satisfy the European ECE-R100 regulation.

Furthermore, in another exemplary aspect of the self-extinguishing resin molded body of a first embodiment and a second embodiment, in addition to the aforementioned requirements (I) to (III), the following requirements (IV) and (V) may be further satisfied.

(IV) A total calorific value measured by a heat generation test using a cone calorimeter in accordance with the method described below is 10 MJ/m$^2$ or less after 130 seconds from the start of heating.

(V) When measuring the total calorific value by a heat generation test using a cone calorimeter in accordance with the method described below, no hole is formed on the aluminum foil covering the aforementioned self-extinguishing resin molded body after 5 minutes from the start of heating.

Heat generation test using a cone calorimeter: based on ISO5660-1, a molded body in the shape of a plaque having a size of 100 mm×100 mm and a thickness of 2.0 mm with all surfaces covered with aluminum foil (having a thickness of 12 μm) except for the surface to be heated is used as the sample, and heating is performed for 5 minutes at a radiant heat intensity of 50 kW/m$^2$. A cone calorimeter C4 (available from Toyo Seiki Seisaku-sho, Ltd.), for example, can be used as the test device.

The requirement (IV) is a total calorific value of 10 MJ/m$^2$ or less after 130 seconds from the start of heating in a preferred aspect of the present invention, a total calorific value of 9 MJ/m$^2$ or less after 130 seconds from the start of heating in another preferred aspect of the present invention, and a total calorific value of 8 MJ/m$^2$ or less after 130 seconds from the start of heating in yet another preferred aspect of the present invention.

The "hole" in requirement (V) refers to a through hole that penetrates the aluminum foil all the way through along the thickness direction, not including holes with a maximum diameter of 3 mm or less, blind holes, or dents. In the heat generation test using a cone calorimeter, because all surfaces of the sample are covered with aluminum foil except for the surface to be heated, when heat is transferred mainly to the covered portion of the surface opposite the surface to be heated, and the temperature exceeds the melting point of aluminum, which is approximately 660° C., the aluminum foil melts, and a hole is formed.

According to some embodiments of the present invention, as long as the content ratios of components (B) and (C) in the resin molded body are within the following rages, the resin molded body may be made by using a resin mixture containing a resin component containing the polyolefin resin of component (A), such as a master batch (MB). That is, for example, the resin molded body may be obtained by molding the following resin compositions (i) to (iii), or by molding a resin composition obtained by mixing the resin compositions (i) to (iii) and the polyolefin resin of component (A).

(i) A resin composition containing a resin mixture containing the phosphorus-based flame retardant of component (B) and the long glass fiber of component (C) (flame retardant MB and resin-applied glass fiber bundle pellets). Here, the resin component in the resin mixture is included in component (A).

(ii) A resin composition containing a resin mixture containing the phosphorus-based flame retardant of component (B) and a resin mixture containing the short glass fiber of component (C) and any phosphorus-based flame retardant (flame retardant MB and short glass fiber MB containing a flame retardant). Here, the resin component in the resin mixture is included in component (A).

(iii) A resin composition containing a resin mixture containing the phosphorus-based flame retardant of component (B) and a resin mixture containing the short glass fiber of component (C) (flame retardant MB and short glass fiber MB). Here, the resin component in the two resin mixtures is included in component (A).

According to some embodiments of the present invention, the content ratio of the phosphorus-based flame retardant of component (B) in the resin molded body is from 15 to 30 mass %, and from 17 to 28 mass % in a preferred aspect of the present invention, from 19 to 26 mass % in another preferred aspect of the present invention, and from 21 to 25 mass % in yet another preferred aspect of the present invention.

According to some embodiments of the present invention, the content ratio of the glass fiber of component (C) in the resin molded body is from 5 to 50 mass %, and from 10 to 45 mass % in a preferred aspect of the present invention, from 10 to 45 mass % in another preferred aspect of the present invention, from 15 to 40 mass % in yet another preferred aspect of the present invention, and from 17 to 37 mass % in yet further another preferred aspect of the present invention. The remaining mass percentage is component (A), with which the total mass percentage of components (A), (B), and (C) is 100.

Furthermore, in the resin molded body according to some embodiments of the present invention, when a resin composition containing a carbon black in addition to component (B) and component (C) is used, the content of the carbon black in the resin molded body may be from 0.03 to 3 mass % in a preferred aspect of the present invention, from 0.1 to 1 mass % in another preferred aspect of the present invention, and from 0.2 to 0.7 mass % in yet another preferred aspect of the present invention. In this case as well, the remaining mass percentage is component (A), with which the total mass percentage is 100.

Furthermore, according to some embodiments of the present invention, the content ratio of component (B) with respect to the total content of component (A) and component (B) in the resin molded body, which can be calculated according to the formula (B)/[(A)+(B)]×100, is from 18 to 45 mass % in a preferred aspect of the present invention, from 20 to 40 mass % in another preferred aspect of the present invention, and from 22 to 40 mass % in yet another preferred aspect of the present invention.

When the resin molded body contains a carbonization accelerator as component (D) in addition to the above-mentioned components (A) to (C), for example, a carbonization accelerator selected from the group consisting of magnesium bicarbonate, zinc oxide, titanium oxide, magnesium oxide, and silicon oxide, the content ratio of component (D) in the resin molded body may be from 0.3 to 5 mass %. For example, the content of component (D) in the resin molded body may be from 0.5 to 4.5 mass % in a preferred aspect of the present invention, from 0.7 to 4.0 mass % in another preferred aspect of the present invention, from 0.7 to 3.5 mass % in yet another preferred aspect of the present invention, and from 0.8 to 3.0 mass % in yet further another preferred aspect of the present invention. In this case as well, the remaining mass percentage is component (A), with which the total mass percentage is 100.

The amount of the carbonization accelerator to be added may be from 1 to 30 parts by mass with respect to 100 parts by mass of the total content of the aforementioned (B1) and (B2) according to another embodiment of the present invention, and from 0.5 to 10 parts by mass in another preferred aspect of the present invention, from 0.5 to 6 parts by mass in yet another preferred aspect of the present invention, and from 2 to 5 parts by mass in yet further another preferred aspect of the present invention. When the amount of the carbonization accelerator to be added is within the range described above, good flame retardancy effect, stable extrusion during molding, favorable mechanical properties of the molded body, and good flame retardancy can be achieved.

When the phosphorus-based flame retardant of component (B) contains a carbonization accelerator corresponding to component (D), the carbonization accelerator in component (B) is included in component (D).

According to some embodiments of the present invention, the content ratio of component (D) in the total amount of the glass fiber of component (C) and the carbonization accelerator of component (D), which is calculated according to [(D)/((C)+(D))×100], is from 2 to 13 mass % according to a preferred aspect of the present invention, and from 2.5 to 13 mass % in another preferred aspect of the present invention.

The content ratio of component (D) in the total amount of the polyolefin resin of component (A), the phosphorus-based flame retardant of component (B), and the carbonization accelerator of component (D), which is calculated according to [(D)/((A)+(B)+(D))], may be from 1 to 8 mass % in a preferred aspect of the present invention, from 1 to 6 mass % in another preferred aspect of the present invention, and from 3.1 to 6 mass % in yet another preferred aspect of the present invention.

According to some embodiments of the present invention, the resin molded bodies of a first embodiment and a second embodiment can be molded into various molded bodies using the resin composition by known techniques, such as injection molding, extrusion molding, vacuum forming, profile molding, foaming molding, injection press molding, press molding, blow molding, and gas injection molding. For example, from the perspective of better enjoying the advantages of an embodiment of the present invention as described above, the resin molded body can be molded into various molded bodies by injection molding.

Note that the configurations, combinations thereof, and the like in each embodiment of the present invention are examples, and various additions, omissions, substitutions, and other changes may be made as appropriate without departing from the spirit of the present invention. The present invention is not limited by the embodiments and is limited only by the claims.

EXAMPLES

As component (A), (A-1) to (A-6) containing the poly-olefin resins (A1) to (A6) in the proportions shown in Table 1 below were prepared.

(A1) Homopolypropylene, MFR (melt flow rate) 7, product name "PM600A", available from SunAllomer. Ltd.

(A2) Homopolypropylene, MFR 30, product name "PM900A", available from SunAllomer. Ltd.

(A3) High-flow homopolypropylene, MFR 70, product name "PMB02A", available from SunAllomer. Ltd.

(A4) Propylene-ethylene block copolymer, MFR 3, product name "PM472W", available from SunAllomer. Ltd.

(A5) High-flow propylene-ethylene block copolymer, MFR 60, product name "PMB60A", available from SunAllomer. Ltd.

(A6) Maleic anhydride-modified polypropylene, MFR 10 (190° C.×0.325 kg), product name "OREVAC CA100", available from Arkema K.K.

(A7) Propylene-ethylene random copolymer, MFR 25, product name "PM921V", available from SunAllomer. Ltd.

The following were used as component (B).

(B-1) Phosphorus-based flame retardant, product name "FP-2500S", available from ADEKA Corporation (B-2) Phosphorus-based flame retardant, product name "FP-2200S", available from ADEKA Corporation (B-3) Phosphorus-based flame retardant, product name "FP-2100JC", available from ADEKA Corporation Resin mixture containing phosphorus-based flame retardant (B-1) prepared according to Production Example 1

Comparative (B) component: (B') Bromine-based flame retardant, product name "SAYTEX 8010", available from Albemarle Japan Corporation Comparative (B) component: A resin mixture containing the bromine-based flame retardant (B'), product name "Hiromaster C-510", available from Suzuhiro Chemical Co., Ltd. (mixture of ethylene bispentabromoben-zene/antimony trioxide:LDPE=80:20 (parts by mass))

The following were used as component (C).

Chopped glass fiber (ECS03T-480, available from Nippon Electric Glass Co., Ltd.), average filament diameter is 13 μm, average length is 3 mm Polypropylene resin-impregnated long glass fiber bundle prepared according to Production Example 2

Component (D): Zinc Oxide, Zinc Oxide II, available from Sakai Chemical Industry Co., Ltd.

The following were used as additional components.

Carbon black master batch (hereinafter referred to as "CBMB"), product name "EPP-K-22771", available from Polycol Industry Co., Ltd. (containing 30 mass % of carbon black, the remainder of the content ratio being a mixture of polypropylene and polyethylene)

Stabilizer 1, product name "Irganox1010", available from BASF Japan

Stabilizer 2, product name "ADK STAB PEP36", available from ADEKA Corporation

Lubricant, product name "ALFLOW H-50S", available from NOF Corporation. (ethylene bis stearamide)

Flame retardant aid, product name "Fire Cut AT-3CN", available from Suzuhiro Chemical Co., Ltd. (antimony oxide)

Anti-dripping agent, product name "Fluon PTFE CD 145E", available from AGC Inc. (polytetrafluoroethyl-ene PTFE)

The methods for measuring the evaluation items were as follows.

(1) MFR (g/10 min)

Measured at a temperature of 230° C. and a load of 2.16 kg in accordance with ISO 1133.

(2) Tensile Strength (MPa)

Measured in accordance with ISO 527.

(3) Flexural Strength (MPa)

Measured in accordance with ISO 178.

(4) Flexural Modulus (MPa)

Measured in accordance with ISO 178.

(5) Charpy Impact Strength ($kJ/m^2$)

Notched Charpy impact strength was measured in accordance with ISO 179/1eA.

Flame Retardancy

Bar-shaped test pieces (125 mm×13 mm×thickness of 1.5 mm made of the compositions of Examples and Comparative Examples were tested in a UL 94 vertical burning test (V test) using a 20 mm flame.

(Oxygen Index)

In accordance with JIS K7201-2, a V-shaped test piece having a thickness of 0.5 mm was tested, and oxygen index was measured by increasing or decreasing oxygen concentration in increments of 0.5%.

Total Calorific Value

The total calorific value was measured using samples of molded body in the shape of a plaque having a size of 100 mm×100 mm and a thickness of 2.0 mm in accordance with ISO 5660-1 by a cone calorimeter C4 (available from Toyo Seiki Seisaku-sho, Ltd.) as a test device. Heating was performed for 5 minutes at a radiant heat intensity of 50 $kW/m^2$. All surfaces of a sample were covered with aluminum foil (thickness: 12 μm) except for the surface to be heated. The results of the total calorific value [$MJ/m^2$] and the presence or absence of hole formation on the aluminum foil (by visual observation) after 130 sec from the start of heating are shown in Table 6.

Evaluation of Self-Extinguishing Property and Hole Formation by Plaque Burning Test Molded bodies in a shape of a plaque having a size of 150 mm×150 mm and a thickness of 2.0 mm were used as samples. Within two minutes after the completion of the burning test by the above burning test method E, resin molded bodies according to an embodiment of the present invention which self-extinguished were evaluated as "(Self-extinguishing property) Present", while resin molded bodies according to an embodiment of the present invention which did not self-extinguish were evaluated as "(Self-extinguishing property) Absent".

In addition, after the resin molded bodies self-extinguished, or after fire was extinguished by blocking the air (oxygen) via, for example, covering the resin molded bodies with a lid, the resin molded bodies having a through hole with a maximum diameter of more than 3 mm were evaluated as "(Hole) Present", while the resin molded bodies with no through holes were evaluated as "(Hole) Absent".

Production Example 1 (Production of Resin Mixture Containing Phosphorus-Based Flame Retardant (B-1))

30 parts by mass of PP resin (A7), 0.20 parts by mass of stabilizer 1, 0.20 parts by mass of stabilizer 2, and 2.50 parts by mass of the lubricant were dry blended, and then fed from the hopper of a twin-screw extruder (TEX30α, available from the Japan Steel Works, Ltd., at 230° C.). Then, 70 parts by mass of component (B-1) was fed from the side feeder.

The mixture was then melt-kneaded and shaped to obtain a resin mixture containing the phosphorus-based flame retardant (B-1) (as pellets having a diameter of 3.0 mm and a length of 3.0 mm) shown in Table 4.

Production Example 2 (Production of Polypropylene Resin-Impregnated Long Glass Fiber Bundle)

A long glass fiber bundle (approximately 4000 filaments of fiber) of component (C) having an average filament diameter of 17 μm was passed through a crosshead die. A blend of (A3) PP resin:(A6) PP resin:stabilizer 1:stabilizer 2=48.0:1.50:0.25:0.25 (parts by mass) was melted and fed. The glass fiber bundle was impregnated with the blend, and a resin-impregnated long glass fiber bundle was obtained. Thereafter, the fiber bundle was shaped (diameter: 2.5 mm) by a shaping nozzle at the outlet of the crosshead die and a shaping roll, and cut to 11 mm by a pelletizer to obtain a resin-impregnated glass fiber bundle (as pellets) containing 50 mass % of the glass fiber (C). When the resin-impregnated glass fiber bundle obtained in this manner was cut, it was confirmed that the glass fiber filaments were almost parallel to the length direction, and the center of the fiber bundle was impregnated with the resin.

Examples 1 to 17, Comparative Examples 1 to 6

In accordance with the amounts shown in Tables 1 to 3, after dry-blending the components (unit: parts by mass) other than component (C), the mixtures were supplied from the hopper of a twin-screw extruder (TEX30α, available from the Japan Steel Works, Ltd., at 230° C.). Then, component (C) was fed from the side feeder. The mixtures were then melt-kneaded and shaped to obtain pellets of each of the resin compositions as shown in Tables 2 to 3. These kneaded pellets were charged into an injection molding machine (FANUC ROBOSHOT α-S150iA, available from FANUC Corporation, with the mold at 50° C. and molding temperature at 220° C.) to obtain resin molded bodies. Evaluation results are shown in Tables 2 and 3.

TABLE 1

|  | (A-1) | (A-2) | (A-3) | (A-4) | (A-5) | (A-6) |
|---|---|---|---|---|---|---|
| (A1) PP Resin (mass %) | 15 | 15 | 15 | 15 |  | 15 |
| (A2) PP Resin (mass %) | 54 |  | 54 |  |  |  |
| (A3) PP Resin (mass %) |  | 54 |  | 54 | 50 | 50 |
| (A4) PP Resin (mass %) | 30 | 30 |  |  | 49 |  |
| (A5) PP Resin (mass %) |  |  | 30 | 30 |  | 30 |
| (A6) Acid-modified PP (mass %) | 1 | 1 | 1 | 1 | 1 | 5 |

TABLE 2

| | | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|---|---|---|---|---|
| Molded Body (parts by mass) (A) PP Resin | (A-1) | 100 | | | | | | | | | | | 100 | 100 | | | | |
| | (A-2) | | 100 | | | | | | | | | | | | 100 | 100 | | |
| | (A-3) | | | 100 | | | | | | | | | | | | | 100 | 100 |
| | (A-4) | | | | 100 | | | | 100 | 100 | 100 | 100 | | | | | | |
| | (A-5) | | | | | 100 | 100 | 100 | | | | | | | | | | |
| (B) Flame Retardant | (B-1) Flame Retardant | 40 | 40 | 60 | 42.5 | 42.5 | 42.5 | 60 | | | | | 40 | 30 | 40 | 40 | 46 | 40 |
| | (B-2) Flame Retardant | | | | | | | | 42.5 | 42.5 | 42.5 | | | | | | | |
| | (B') Flame Retardant | | | | | | | | | | | 42.5 | | | | | | |
| (C) Glass Fiber | (C-1) Chopped Glass Fiber | 35.4 | 35.4 | 40.4 | 36 | 36 | 48.5 | 70 | 36 | 36 | 36 | 36 | 36 | 33.2 | 36 | 36 | 64.12 | 61.25 |
| CBMB | | | | | 1.26 | 1.26 | 1.35 | 1.62 | | 1.26 | 3.3 | 5.4 | 3.25 | 3.02 | 3.25 | 3.25 | 2.12 | 1.42 |
| Stabilizer 1 | | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Stabilizer 2 | | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Lubricant | | 1 | 1 | 1 | 1 | 1 | 1 | 1 | 1 | 1 | 1 | 1 | 1 | 1 | 1 | 1 | 1 | 1 |
| Content of (B) in Molded Body | mass % | 22.6 | 22.6 | 29.7 | 23.4 | 23.4 | 21.9 | 25.7 | 23.6 | 23.4 | 23.2 | 22.9 | 22.1 | 17.9 | 22.1 | 22.1 | 21.5 | 19.6 |
| Content of (C) in Molded Body | mass % | 20 | 20 | 20 | 20 | 20 | 25 | 30 | 20 | 20 | 20 | 20 | 20 | 20 | 20 | 20 | 30 | 30 |
| (B)/[(A) + (b)] | mass % | 28.6 | 28.6 | 37.5 | 29.8 | 29.8 | 29.8 | 37.5 | 29.8 | 29.8 | 29.8 | 29.8 | 28.6 | 23.1 | 28.6 | 28.6 | 31.5 | 28.6 |
| MFR 230° C./2.16 kg | g/10 min | 3.4 | 5 | 2.6 | 3.2 | 6.4 | 6.1 | 4.2 | 3.6 | 3.9 | 3.1 | 3 | 3.4 | 3.7 | 6.4 | 9.6 | 8.8 | 9.7 |
| Mechanical Properties Tensile Strength | MPa | 71 | 72 | 67 | 69 | 73 | 82 | 82 | 70 | 70 | 70 | 68 | 67 | 69 | 71 | 72 | 85 | 82 |
| Flexural Strength | MPa | 117 | 119 | 112 | 113 | 120 | 136 | 138 | 117 | 116 | 116 | 113 | 111 | 114 | 118 | 120 | 140 | 137 |
| Flexural Modulus | MPa | 6000 | 6000 | 6670 | 6100 | 6290 | 7450 | 9380 | 6150 | 6150 | 6150 | 5860 | 5930 | 5530 | 6100 | 6100 | 8720 | 8600 |
| Charpy Impact Strength | kJ/m² | 10.2 | 10 | 8.8 | 9.6 | 9.4 | 10 | 8.8 | 10.3 | 10.3 | 10.3 | 10.2 | 9.7 | 10.4 | 9.4 | 9.2 | 10.1 | 10 |
| Specific Strength (Tensile) | kN · m/kg | 60 | 61 | 54 | 58 | 61 | 66 | 61 | 58 | 58 | 58 | 57 | 56 | 59 | 60 | 61 | 65 | 63 |
| Specific Strength (Flexural) | kN · m/kg | 98 | 100 | 90 | 94 | 100 | 110 | 103 | 98 | 97 | 97 | 94 | 93 | 98 | 99 | 101 | 108 | 105 |
| Specific Modulus (Flexural) | kN · m/kg | 5040 | 5040 | 5340 | 5080 | 5240 | 6010 | 7000 | 5130 | 5130 | 5130 | 4880 | 4980 | 4770 | 5130 | 5130 | 6710 | 6620 |
| Flammability UL94/1.5 mmt | — | V-0 | V-0 | V-0 | V-0 | V-0 | V-0 | V-0 | V-0 | V-0 | V-0 | V-0 | V-0 | V-0 | V-0 | V-0 | V-0 | V-0 |
| Density | g/cm³ | 1.19 | 1.19 | 1.25 | 1.2 | 1.2 | 1.24 | 1.34 | 1.2 | 1.2 | 1.2 | 1.2 | 1.2 | 1.16 | 1.19 | 1.19 | 1.3 | 1.3 |
| Molded Body Hole Formation Method E/2.0 mmt | | Absent | Absent | Absent | Absent | Absent | Absent | Absent | Absent | Absent | Absent | Absent | Absent | Absent | Absent | Absent | Absent | Absent |

TABLE 2-continued

| Burning Test | | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|---|---|---|---|---|
| | Self-extinguishing Property | Present | Present | Present | Present | Present | Present | Present | Present | Present | Present | Present | Present | Present | Present | Present | Present | Present |

TABLE 3

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Molded Body (parts by mass) | (A) PP Resin | (A-1) | | 100 | | | | | |
| | | (A-2) | | | | | | | |
| | | (A-3) | | | | | | | |
| | | (A-4) | | | | | | | |
| | | (A-5) | | | 100 | 100 | 100 | 100 | 100 |
| | (B) Flame Retardant | (B-1) Flame Retardant | | 20 | | | | | |
| | | (B-2) Flame Retardant | | | | | | | |
| | | (B') Flame Retardant | | | 40 | 40 | 40 | 44 | 40 |
| | Flame Retardant Aid | Flame Retardant Aid | | | 15 | 15 | 15 | 15 | 15 |
| | | Anti-dripping Agent | | | | | 0.88 | 0.88 | 0.88 |
| | (C) Glass Fiber | (C) Chopped Glass Fiber | | 30.7 | 53 | 67 | 68 | 70 | 106 |
| | | CBMB | | 2.79 | 1.47 | 1.57 | 1.58 | 1.62 | 1.84 |
| | | Stabilizer 1 | | 0.3 | 0.5 | 0.5 | 0.5 | 0.5 | 0.5 |
| | | Stabilizer 2 | | 0.2 | 0.5 | 0.5 | 0.5 | 0.5 | 0.5 |
| | | Lubricant | | 1 | 0.6 | 0.6 | 0.6 | 0.6 | 0.6 |
| Content of (B) in Molded Body | | | mass % | 12.9 | 19 | 17.8 | 17.6 | 18.9 | 15.1 |
| Content of (C) in Molded Body | | | mass % | 20 | 25 | 30 | 30 | 30 | 40 |
| (B)/[(A) + (B)] | | | mass % | 16.7 | 28.6 | 28.6 | 28.6 | 30.6 | 28.6 |
| MFR | 230° C./2.16 kg | | g/10 min | 4.1 | 4.0 | 3.3 | 2.6 | 2.1 | 1.7 |
| Mechanical Properties | Tensile Strength | | MPa | 71 | 76 | 78 | 78 | 77 | 72 |
| | Flexural Strength | | MPa | 114 | 124 | 129 | 128 | 128 | 120 |
| | Flexural Modulus | | MPa | 5100 | 7040 | 8290 | 8480 | 8560 | 11200 |
| | Charpy Impact Strength | | kJ/m² | 10.9 | 11 | 10.4 | 9.8 | 9.8 | 7.3 |
| | Specific Strength (Tensile) | | kN · m/kg | 63 | 54 | 54 | 54 | 52 | 46 |
| | Specific Strength (Flexural) | | kN · m/kg | 102 | 88 | 89 | 88 | 87 | 77 |
| | Specific Modulus | | kN · m/kg | 4550 | 4990 | 5720 | 5850 | 5820 | 7230 |
| Flammability | UL94/1.5 mmt | | — | Not V | V-1 | Not V | V-1 | V-1 | V-1 |
| | Density | | g/cm² | 1.12 | 1.41 | 1.45 | 1.45 | 1.47 | 1.55 |
| Molded Body Burning Test | Method E/2.0 mmt | Hole Formation | | Absent | Present | Present | Present | Present | Present |
| | | Self-extinguishing Property | | Absent | Present | Present | Present | Present | Present |

Examples 18 to 20, Comparative Examples 7 and 8

The polyolefin resin of component (A), a resin mixture containing a phosphorus-based flame retardant (B), and the resin-impregnated long glass fiber bundle of Production Example 2 were dry-blended in accordance with the formulations shown in Table 4 and then charged into an injection molding machine (FANUC ROBOSHOT α-S150iA, available from FANUC Corporation, with the mold at 50° C. and molding temperature at 220° C.) to obtain resin molded bodies. The evaluation results are shown in Table 4.

TABLE 4

| | | | | Example 18 | Example 19 | Example 20 | Comparative Example 7 | Comparative Example 8 |
|---|---|---|---|---|---|---|---|---|
| Molded Body (parts by mass) | (A) PP Resin | PP Resin (A3) | | 25.5 | 23.7 | | 20.2 | |
| | (B) Flame Retardant | Resin Mixture Containing Phosphorus-based Flame Retardant (B-1) | | 34.5 | 34.5 | 38.2 | | |
| | | Resin Mixture Containing Bromine-based Flame Retardant (B') | | | | | 38 | 38.2 |
| | (C) Glass Fiber | Resin-impregnated Long Glass Fiber Bundle (Containing 50 mass % of Long Glass Fiber (C)) | | 40 | 40 | 60 | 40 | 60 |
| | | CBMB | | | 1.8 | 1.8 | 1.8 | 1.8 |
| | | Total (parts by mass) | | 100 | 100 | 100 | 100 | 100 |
| Content of Phosphorus-based Flame Retardant (B) in Molded Body | | | mass % | 24.2 | 24.2 | 26.7 | 22.8 | 22.9 |
| Content of Glass Fiber (C) in Molded Body | | | mass % | 20 | 20 | 30 | 20 | 30 |
| (B)/[(A) + (B)] | | | mass % | 30.2 | 30.2 | 38.1 | 28.5 | 32.7 |
| Mechanical Properties | Tensile Strength | | MPa | 93 | 91 | 105 | 92 | 106 |
| | Flexural Strength | | MPa | 137 | 135 | 160 | 137 | 163 |
| | Flexural Modulus | | MPa | 6100 | 6100 | 8200 | 6030 | 9200 |
| | Charpy Impact Strength | | kJ/m² | 16.2 | 16 | 25 | 17.8 | 19 |
| | Specific Strength (Tensile) | | kN · m/kg | 78 | 76 | 78 | 65 | 67 |
| | Specific Strength (Flexural) | | kN · m/kg | 115 | 113 | 119 | 97 | 103 |
| | Specific Modulus | | kN · m/kg | 5130 | 5130 | 6070 | 4280 | 5820 |
| Flammability | UL94/1.5 mmt | | — | V-0 | V-0 | V-0 | V-1 | V-1 |
| | Density | | g/cm² | 1.19 | 1.19 | 1.35 | 1.41 | 1.58 |

TABLE 4-continued

| | | | Example 18 | Example 19 | Example 20 | Comparative Example 7 | Comparative Example 8 |
|---|---|---|---|---|---|---|---|
| Molded Body Burning Test | Method E/2.0 mmt | Hole Formation | Absent | Absent | Absent | Present | Present |
| | | Self-extinguishing Property | Present | Present | Present | Present | Present |

As shown in Table 2, Examples 1 to 17 obtained resin molded bodies with high mechanical strength in addition to self-extinguishing property and high flame retardancy. Meanwhile, among the molded bodies in Table 3, the one obtained in Comparative Example 1, which contained a low amount of the flame retardant (B), had insufficient flame retardancy and did not exhibited self-extinguishing property. Furthermore, among the molded bodies in Table 3, the ones obtained in Comparative Examples 2 to 6, which contained the bromine-based flame retardant, were all evaluated as "Hole Formation Present" in the evaluation of hole formation in accordance with the burning test method E and were not able to obtain flame retardancy that satisfies fire resistance testing standards such as those described in ECE-R100. The oxygen index in Comparative Example 1 in Table 3 was 20, while the oxygen index in Comparative Example 5 was 24.5.

Compared with the molded bodies obtained in Examples 1 to 17 which used a short glass fiber as component (C), as shown in Table 2, molded bodies obtained in Example 18 to 20 which used the resin-impregnated glass fiber bundle as component (C), as shown in Table 4, achieved higher mechanical strength while maintaining self-extinguishing property and a high flame retardancy.

Examples 21 to 26, Comparative Examples 9 and 10

The polyolefin resin of component (A), a resin mixture containing a phosphorus-based flame retardant (B), the resin-impregnated long glass fiber bundle of Production Example 2, and the zinc oxide of component (D) were dry-blended in accordance with the formulations shown in Table 5 and then charged into an injection molding machine (FANUC ROBOSHOT α-S150iA, available from FANUC Corporation, with the mold at 50° C. and molding temperature at 220° C.) to obtain resin molded bodies. The evaluation results are shown in Table 5.

TABLE 5

| | | | Example 21 | Example 22 | Comparative Example 9 | Example 23 | Comparative Example 10 | Example 24 | Example 25 | Example 96 |
|---|---|---|---|---|---|---|---|---|---|---|
| Molded Body (parts by mass) | (A) PP Resin | (A-1) | | | | | | | 100 | 100 |
| | | (A-4) | 100 | 100 | 100 | 100 | 100 | | | |
| | | (A-6) | | | | | | 100 | | |
| | (B) Flame Retardant | (B-3) | 44 | 44 | 28 | 45.3 | 28 | 44 | 38.2 | 40 |
| | (C) Glass Fiber | | 64.33 | 64.33 | — | 65.14 | — | 64.33 | 36 | 36 |
| | (D) Zinc Oxide | | — | 2.07 | 1.31 | 5.26 | 4.43 | 7.58 | 1.8 | 5.08 |
| | CBMB | | 2.12 | 2.12 | 1.31 | 2.16 | 1.34 | 2.12 | 1.84 | 1.84 |
| | Stabilizer 1 | | 0.3 | 0.3 | 0.3 | 0.3 | 0.3 | 0.3 | 0.3 | 0.3 |
| | Stabilizer 2 | | 0.2 | 0.2 | 0.2 | 0.2 | 0.2 | 0.2 | 0.2 | 0.2 |
| | Lubricant | | 1 | 1 | 1 | 1 | 1 | 1 | 1 | 1 |
| Content of (B) in Molded Body | | mass % | 20.8 | 20.6 | 21.2 | 20.7 | 20.7 | 20 | 21.3 | 21.7 |
| Content of (C) in Molded Body | | mass % | 30.4 | 30.1 | 0.0 | 29.7 | 0.0 | 29.3 | 20.1 | 19.5 |
| Content of (D) in Molded Body | | mass % | — | 0.97 | 0.99 | 2.40 | 3.27 | 3.45 | 1.00 | 2.75 |
| (B)/[(A) + (B)] | | mass % | 30.6 | 30.6 | 21.9 | 31.2 | 21.9 | 30.6 | 27.6 | 28.6 |
| (D)/[(C) + (D)] | | mass % | — | 3.12 | — | 7.47 | — | 10.5 | 4.76 | 12.4 |
| (D)/[(A) + (B) + (D)] | | mass % | — | 1.42 | 1.01 | 3.49 | 3.35 | 5.0 | 1.29 | 3.5 |
| MFR | 230° C./2.16 kg | g/10 min | 12 | 10.9 | 31 | 10.9 | 31.9 | 9 | 3.4 | 2.5 |
| Mechanical Properties | Tensile Strength | MPa | 80 | 78 | 25 | 73 | 24 | 75 | 62 | 60 |
| | Flexural Strength | MPa | 135 | 131 | 44 | 126 | 44 | 128 | 104 | 100 |
| | Flexural Modulus | MPa | 8700 | 8790 | 2100 | 8860 | 2120 | 8900 | 6000 | 6400 |
| | Charpy Impact Strength | kJ/m² | 9.5 | 9.0 | 1.9 | 78 | 1.5 | 8 | 9.2 | 7.5 |
| | Specific Strength (Tensile) | kN · m/kg | 62 | 60 | 25 | 56 | 24 | 56 | 52 | 49 |
| | Specific Strength (Flexural) | kN · m/kg | 104 | 101 | 44 | 97 | 44 | 96 | 87 | 82 |
| | Specific Modulus | kN · m/kg | 6690 | 6760 | 2100 | 6820 | 2120 | 6690 | 5000 | 5250 |
| Flammability | UL94/1.5 mmt | | V-0 | V-0 | V-2 | V-0 | V-2 | V-0 | V-0 | V-0 |
| Oxygen Index | | | 27.0 | 27.5 | 24.5 | 28.5 | 25.0 | 29.5 | 27.0 | 27.5 |
| | Density | g/cm² | 1.29 | 1.3 | 1.0 | 1.3 | 1.0 | 1.33 | 1.2 | 1.22 |
| Molded Body Burning Test | Method E/2.0 mmt | Hole Formation | Absent | Absent | Present | Absent | Present | Absent | Absent | Absent |
| | | Self-extinguishing Property | Present | Present | Absent | Present | Absent | Present | Present | Present |

TABLE 6

| | Total Calorific Value after 130 sec from Start of Heating [MJ/m$^2$] | Hole Formation on Aluminum Foil |
|---|---|---|
| Example 3 | 3.1 | Absent |
| Example 13 | 8.2 | Absent |
| Example 15 | 7.1 | Absent |
| Example 16 | 6.4 | Absent |
| Example 18 | 4.5 | Absent |
| Example 19 | 5.1 | Absent |
| Example 20 | 5.4 | Absent |
| Example 21 | 6.2 | Absent |
| Example 22 | 5.5 | Absent |
| Example 24 | 4.9 | Absent |
| Comparative Example 1 | 13 | Absent |
| Comparative Example 5 | 24 | Present |

As is clear from the comparison among Example 21, Example 22, and Comparative Example 9, the comparison between Example 23 and Comparative Example 10, as well as Examples 24 to 26, all shown in Table 5, a molded body with good flame retardancy and mechanical strength can be obtained by using the glass fiber of component (C) and zinc oxide of component (D) in combination. Note that, in Comparative Example 9, the content ratio of component (D) in the total content of component (A), component (B), and component (D) is 1.01 mass %, which corresponds to that of the invention described in JP 5048936 B.

INDUSTRIAL APPLICABILITY

The resin molded body according to an example of the present invention has flame retardancy and self-extinguishing property that comply with the standards for fire resistance tests, such as ECE-R100, and therefore can be used in: battery-powered electric transportation devices, such as electric vehicles, electric shuttle buses, electric trucks, electric two-wheelers, electric wheelchairs, and electric standing two-wheelers; in particular, all or part of the battery module enclosure of electric transportation devices that use built-in batteries which cannot be removed, and peripheral parts thereof (fastening parts, etc.); furthermore, a charger connector for electric vehicles, a battery capacitor holder, a battery capacitor enclosure, and an enclosure for charging stand for electric vehicles.

The invention claimed is:

1. A self-extinguishing resin molded body obtained from a resin composition consisting essentially of a polyolefin resin (A), a phosphorus-based flame retardant (B) other than ammonium polyphosphate, a glass fiber (C), and a carbonization accelerator (D) selected from the group consisting of magnesium bicarbonate, zinc oxide, titanium oxide, magnesium oxide, and silicon oxide, wherein the molded body comprises from 15 to 30 mass % of the phosphorus-based flame retardant (B), from 5 to 50 mass % of the glass fiber (C), and from 0.3 to 5 mass % of the carbonization accelerator (D), the content ratio of component (D) in the total amount of component (C) and component (D) being from 2 to 13 mass %; and the resin molded body satisfies (I) to (III):

(I) A thickness of the self-extinguishing resin molded body is from 2.0 to 6.0 mm;

(II) The self-extinguishing resin molded body self-extinguishes within two minutes after the completion of a burning test using burning test method E as described below;

(III) The self-extinguishing resin molded body does not have a hole after being subjected to a burning test using burning test method E as described below;

Burning test method E: A plaque (150×150×2.0 mm) made of the molded body described above is used, a 200 mm-long flame is applied from above the plaque directly onto the center of the plaque for 130 seconds, and the distance from the flame contact position on the plaque to the burner mouth is 150 mm, wherein the glass fiber (C) is in the form of a resin-impregnated long fiber bundle, which is a long glass fiber bundle having the polyolefin resin of component (A) applied in a molten state and being integrated before being cut to a length from 5 mm to 50 mm, the long glass fiber bundle being a fiber bundle in which the filaments of the glass fiber (C) are aligned in a lengthwise direction and bundled together, the glass fiber content in the resin-impregnated long fiber bundle being 20 to 65 mass %.

2. The self-extinguishing resin molded body according to claim 1, further satisfying (IV) and (V):

(IV) A total calorific value measured by a heat generation test using a cone calorimeter in accordance with the method described below is 10 MJ/m$^2$ or less after 130 seconds from the start of heating;

(V) When measuring the total calorific value by a heat generation test using a cone calorimeter in accordance with the method described below, no hole is formed on an aluminum foil covering the self-extinguishing resin molded body after 5 minutes from the start of heating;

Heat generation test using a cone calorimeter: based on ISO5660-1, a molded body in the shape of a plaque having a size of 100 mm×100 mm and a thickness of 2.0 mm with all surfaces covered with aluminum foil (having a thickness of 12 μm) except for the surface to be heated is used as a sample, and heating is performed for 5 minutes at a radiant heat intensity of 50 kW/m$^2$.

3. The self-extinguishing resin molded body according to claim 1, wherein a content ratio of component (B) with respect to the total content of component (A) and component (B) in the molded body, which can be calculated according to the formula (B)/[(A)+(B)]×100, is from 18 to 45 mass %.

4. The self-extinguishing resin molded body according to claim 1, wherein component (A) is a polypropylene resin.

5. The self-extinguishing resin molded body according to claim 1, wherein the self-extinguishing resin molded body is an enclosure part or a peripheral part of a battery module in a battery-powered electric transportation device.

* * * * *